(12) United States Patent
Jeong (10) Patent No.: US 7,222,267 B2
(45) Date of Patent: May 22, 2007

(54) METHOD OF PROVIDING INFORMATION ON ERRORS OF HARD DISK DRIVE, HARD DISK DRIVE THEREFOR AND INFORMATION PROCESSING APPARATUS THEREFOR

(75) Inventor: Seung-youl Jeong, Taean-eup (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 638 days.

(21) Appl. No.: 10/685,709

(22) Filed: Oct. 16, 2003

(65) Prior Publication Data

US 2004/0153880 A1 Aug. 5, 2004

(30) Foreign Application Priority Data

Oct. 17, 2002 (KR) .................... 10-2002-0063533

(51) Int. Cl.
*G06F 11/00* (2006.01)
(52) U.S. Cl. .......................... 714/42; 714/48
(58) Field of Classification Search ................ 714/42, 714/48
See application file for complete search history.

(56) References Cited

U.S. PATENT DOCUMENTS

| | | | | |
|---|---|---|---|---|
| 5,644,705 A | * | 7/1997 | Stanley ........................ | 714/42 |
| 5,761,411 A | * | 6/1998 | Teague et al. ................ | 714/47 |
| 7,010,720 B2 | * | 3/2006 | Maeda et al. ................. | 714/7 |
| 7,120,832 B2 | * | 10/2006 | Collins et al. ................ | 714/42 |
| 2003/0005367 A1 | * | 1/2003 | Lam ............................ | 714/42 |
| 2003/0149918 A1 | * | 8/2003 | Takaichi ....................... | 714/42 |

FOREIGN PATENT DOCUMENTS

JP 3-90996 4/1991

(Continued)

OTHER PUBLICATIONS

Korean Patent Abstracts for Publication No. 1019950002353, dated Jan. 4, 1995.
Fault Diagnostic Device for Electronic Equipment, Publication No. 1997-101905, dated Apr. 15, 1997 (Japan).
Korean Patent Abstracts for Publication No. 1019980014546, dated May 25, 1998.
Diagnostic Method for Failure of Disk Device, Publication No. 1999-184726, dated Jul. 9, 1999 (Japan).

*Primary Examiner*—Michael C. Maskulinski
(74) *Attorney, Agent, or Firm*—Staas & Halsey LLP (57) ABSTRACT

A method of providing error information to an outside of a hard disk drive, the hard disk drive, and a data processing apparatus therefor. The hard disk drive includes a first interface unit transmitting data reproduced from a medium to the outside and receiving data to be recorded on the medium from the outside, a hard disk controller controlling data to be recorded on the medium or reproduced from the medium and providing the error information including a type of an error occurring in the hard disk drive, a state information manager managing the error information provided by the hard disk controller and state information indicating operation conditions of the hard disk drive, and a second interface unit outputting the error information and the state information provided by the state information manager to the outside when the error occurs.

27 Claims, 6 Drawing Sheets

FOREIGN PATENT DOCUMENTS

| | | |
|---|---|---|
| JP | 3-292679 | 12/1991 |
| JP | 5-282103 | 10/1993 |
| JP | 10-162528 | 6/1998 |
| JP | 11-317010 | 11/1999 |
| JP | 411313278 A * | 11/1999 |
| JP | 2000-276559 | 10/2000 |
| JP | 2002-245714 | 8/2002 |
| KR | 1998-11130 | 5/1998 |

* cited by examiner

METHOD OF PROVIDING INFORMATION ON ERRORS OF HARD DISK DRIVE, HARD DISK DRIVE THEREFOR AND INFORMATION PROCESSING APPARATUS THEREFOR

CROSS-REFERENCE TO RELATED APPLICATION

This application claims the priority of Korean Patent Application No. 2002-63533, filed on Oct. 17, 2002, in the Korean Intellectual Property Office, the disclosure of which is incorporated herein by reference.

BACKGROUND OF THE INVENTION

1. Field of the Invention

The present invention relates to a hard disk drive (HDD), and more particularly, to a method of providing information on errors occurring in an HDD, an apparatus to process the error information, and an HDD using the same.

2. Description of the Related Art

Recently, as more advances are being made in the digital era, there has been increasing attention paid to personal video recorders (PVRs) capable of recording broadcast programs for more than 24 hours without a need of an additional tape.

A PVR, also called a digital video record (DVR), is an apparatus to store a digital video stream in real time and to reproduce the stored digital video stream, and includes a hard disk drive (HDD).

During recording data on and reproducing data from a HDD, errors may occur due to an operation temperature of the HDD, defective elements, or a periodic or non-periodic phenomenon of the HDD. When the HDD fails to record data on or reproduce data from a desired sector thereof, the HDD tries to record data on or reproduce data from the desired sector again when the desired sector comes into a predetermined position again while a disk is rotated in the HDD. At this time, the HDD performs various error retrieval operations, such as an off-track reading, an increase or a decrease of a cut-off frequency, an increase or a decrease of a bandwidth, or a variation of a gain value of a finite inverse response (FIR) filter. Such a process is called a retry. If the data corresponding to the errors are not retrieved through the retry process, the HDD notifies a host that unrecoverable errors have occurred and thus to record data on or reproduce data from the desire sector of the disk is not possible.

A conventional system communicates with the HDD installed therein by using ATAPI commands. Among the ATAPI commands, there is a command to notify a host of state of the HDD.

Figure 1:
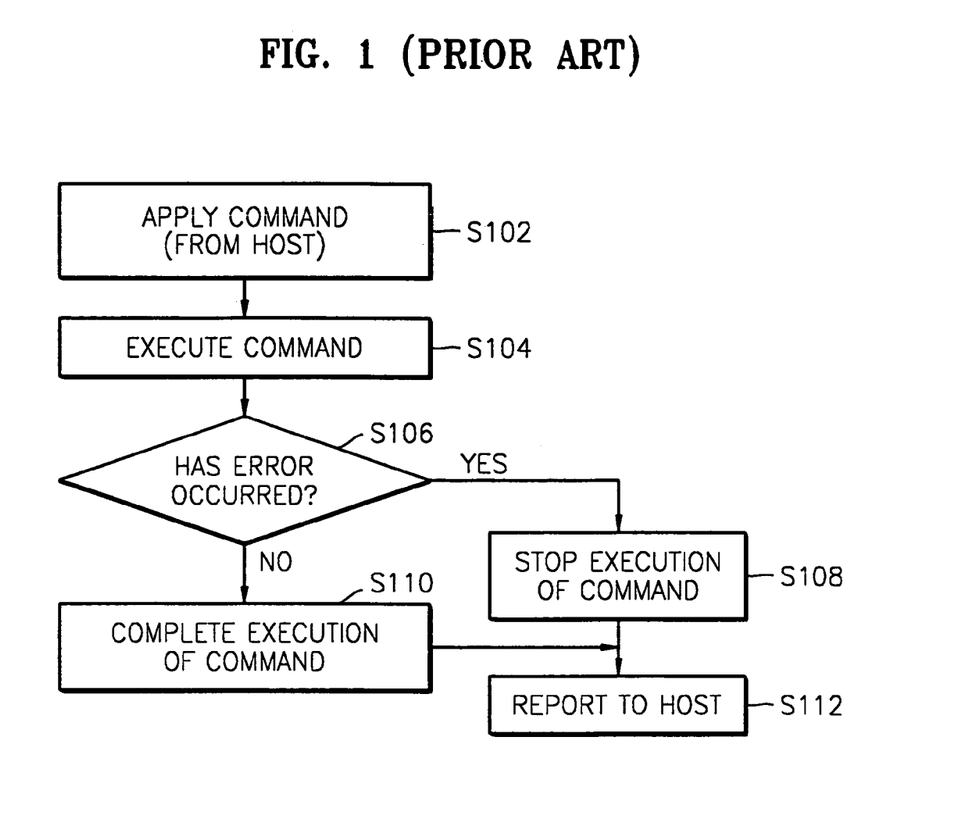
FIG. 1 is a flowchart of an operation of a conventional HDD.

FIG. 1 is a flowchart of the operation of a conventional hard disk drive. Referring to FIG. 1, a command is applied to the HDD from a host in operation S102. The HDD executes the command issued from the host in operation S104. If no error occurs while executing the command, the command is completed in operation S110. If a predetermined error occurs while executing the command in operation S106, the execution of the command is stopped in operation S108. The host is notified of whether or not the performance of the command is stopped or is completed in operation S112.

Further, a content, which the host is notified of by the HDD and a type of the content are defined by an ATAPI command reference.

Figure 2:
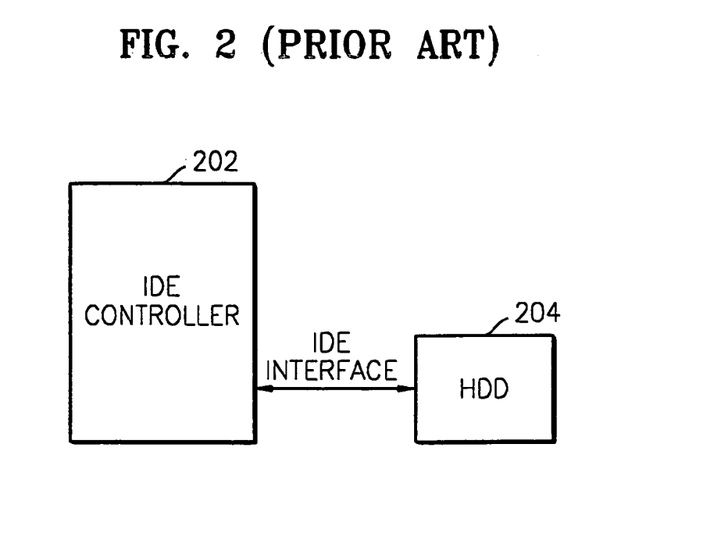
FIG. 2 is a block diagram of a conventional HDD performing the operation shown in FIG. 1.

FIG. 2 is a block diagram of a conventional HDD performing the operation shown in FIG. 1. In FIG. 2, reference numerals 202 and 204 represent an integrated drive electronics (IDE) controller and an HDD, respectively. The IDE controller 202 and the HDD 204 are interfaced via an IDE interface and receive information from or transmit information to each other by using the ATAPI commands.

IDE takes part in transmitting information between a main board and a data storage. AT attachment (ATA) represents terms established by American National Standards Institute (ANSI) adopting the IDE as a standard. Among IDE ports, there are a primary port and a secondary port. The primary and secondary ports each include a master channel and a slave channel. In most cases, the HDD is connected to the primary port, and a CD-ROM is connected to the secondary port.

ATAPI is protocol developed so that a data storage, for example, a CD-ROM, a DVD, or a tape, other than an HDD may share an ATA interface with an HDD. ATAPI is the third ATA standard established by ANSI, after ATA and ATA-2. The reason an IDE interface of the ATAPI is called a packet interface is that a protocol thereof transmits a group of commands, i.e., a packet.

However, to notify a host of whether or not an error has occurred in the HDD in real time, figure out what caused the error, and appropriately respond to the error by using an IDE interface is not possible.

There have been various techniques to diagnose an error having occurred in an HDD, including Japanese Patent No. 1999-184726, Korean Patent Nos. 1998-011130 and 2002-5929, Japanese Patent No. 1997-101905, and Korean Patent Nos. 1998-14546, 2001-58759, and 1995-2353. These techniques provide a method of diagnosing an operation state of an HDD from a host or outside the HDD.

However, such conventional error diagnosing techniques merely check the operation state of an HDD by using a specific program, i.e., a diagnosis program, rather than notifying a host in real time of an error which has occurred during an operation of a disk so as to let the host appropriately respond to the error.

In addition, the conventional error diagnosing techniques use an ATAPI command system, as shown in FIG. 1, and thus they fail to transmit information, which cannot be accepted in the ATAPI command system, to the host.

The conventional error diagnosing techniques can retrieve errors in an HDD by adjusting parameters of the HDD. However, the conventional error diagnosing techniques cannot take any appropriate measure to eliminate an external cause of the error.

For example, a data recording failure may be caused by defects in the HDD or a data transmission system. However, the conventional error diagnosing techniques only eliminate internal causes of the error which has occurred in the HDD, which means the conventional error diagnosing techniques are unable to solve such a recording failure error caused by defects in the data transmission system.

In particular unlike in a PC, to freely separate an HDD from a PVR is difficult, and the PVR does not store a diagnosis program. Accordingly, in a case where an error occurs in the HDD due to such an inconvenient structure of the PVR, for a user to appropriately control an operation of the PVR is not possible.

In the related art, to let an HDD notify a host of information on an error having occurred in the HDD by redefining ATAPI commands is possible. However, the redefinition of the ATAPI commands brings about standards-related problems which cannot be solved using a current level of technology.

SUMMARY OF THE INVENTION

According to an aspect a method is provided of controlling an improved HDD, which is capable of providing information in real time on an error occurring during an operation of the improved HDD.

According to an aspect an improved HDD is provided which uses the control method to control the improved HDD.

According to an aspect an improved data processing apparatus is provided which is capable of determining a state of a system by using error-related information provided by an HDD and suggesting to a user appropriate measures to deal with an error in the HDD based on the state of the system.

According to an aspect a method of providing information on an error in an HDD is provided including a first interface unit transmitting data reproduced from a medium and receiving data to be recorded on the medium and a second interface unit providing error information to an outside of the HDD. The method includes obtaining error information including a type of an error occurring in the HDD and state information indicating operation conditions of the HDD, and outputting the error information and the state information to the outside via the second interface unit.

Additional aspects and/or advantages of the invention will be set forth in part in the description which follows and, in part, will be obvious from the description, may be learned by practice of the invention.

Outputting of the error information and the state information to the outside may be performed in real time irrespective of a data process performed using the first interface unit.

According to another aspect an HDD is provided which records data applied from an outside on a medium or reproduces data recorded on the medium and provides the reproduced data to the outside. The HDD includes a first interface unit transmitting data reproduced from a medium to the outside and receiving data to be recorded on the medium from the outside, a hard disk controller controlling data to be recorded on the medium or reproduced from the medium and providing error information including a type of an error occurring in the HDD, a state information manager managing the error information provided by the hard disk controller and state information indicating operation conditions of the HDD, and a second interface unit outputting the error information and the state information provided by the state information manager to the outside when an error occurs.

The second interface unit may perform a serial interface.

According to a further aspect a data processing apparatus is provided including an HDD having a first interface unit transmitting data reproduced from a medium and receiving data to be recorded on the medium and a second interface unit providing error information to an outside. The data processing apparatus includes a first controller corresponding to the first interface unit, a second controller corresponding to the second interface unit, and a controller controlling data recording and reproducing operations of the HDD by using the first controller, receiving error information provided by the HDD by using the second controller, and providing the error information to a user by using an output device.

The controller may receive state information indicating operation conditions of the HDD as well as the error information from the HDD via the second controller, determines an appropriate measure to deal with an error, which has occurred in the HDD based on the error information and the state information, and informs the user of an appropriate measure.

The data processing apparatus may be a personal video recorder.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
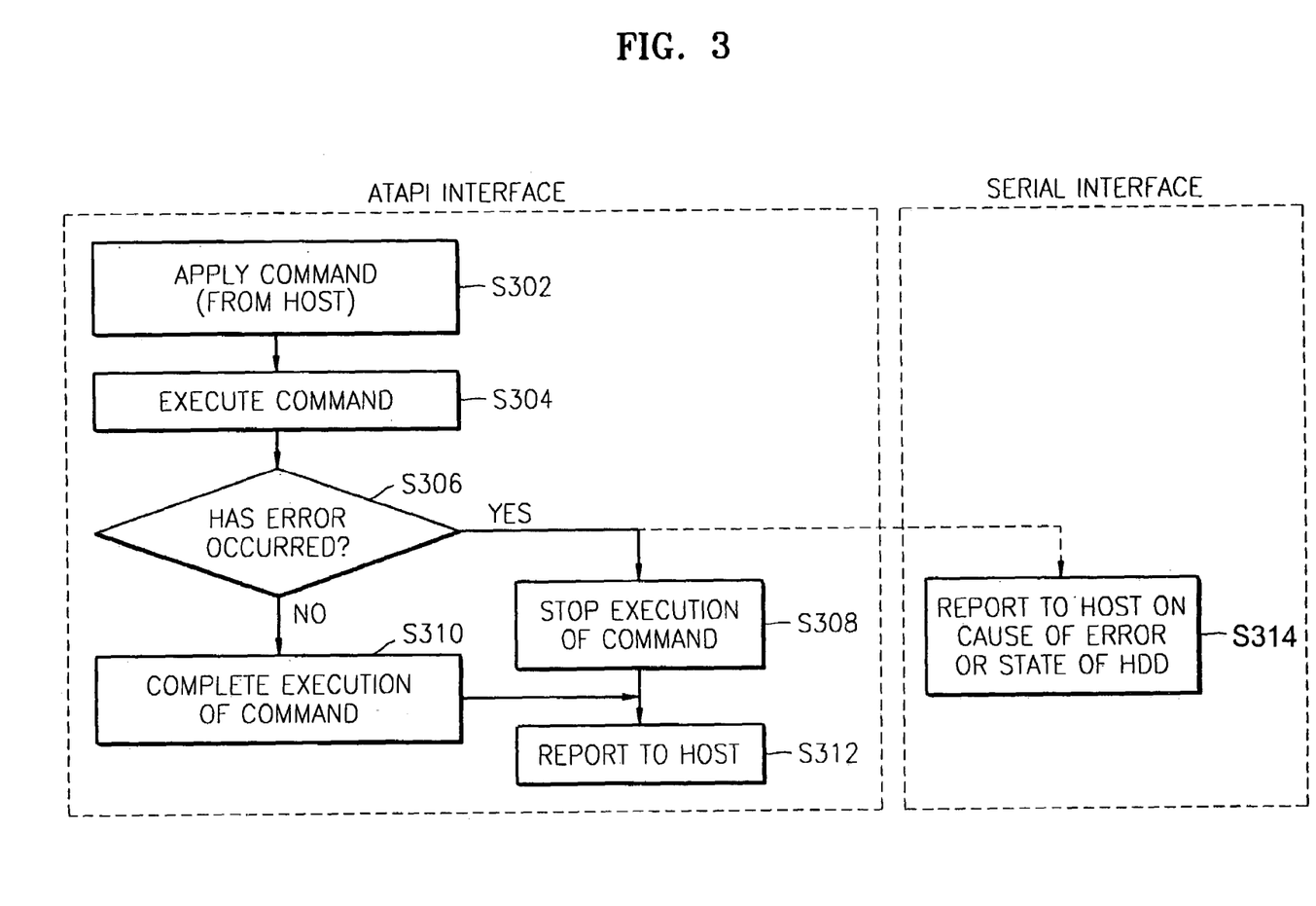
FIG. 3 is a flowchart of a method of providing information on an error occurring in an HDD according to a first embodiment of the present invention.

FIG. 3 is a flowchart of a method of providing information on an error occurring in an HDD according to a first embodiment of the present invention. Referring to FIG. 3, a command is applied to an HDD from a host in operation S302.

The HDD performs the command issued from the host in operation S304. Commands and data are provided via an IDE interface, and the details of the commands are defined by ATAPI command standards. Whether or not an error has occurred is checked in S306. If no error has occurred while executing the command in operation S306, an execution of the command is completed in operation S310. If any error has occurred in the HDD while executing the command in operation S306, the execution of the command is stopped in operation S308. A host is notified as to whether the execution of the command is completed or stopped in operation S312 via the IDE interface, and the process is based on the ATAPI command standards. If a predetermined error has occurred while executing the command in operation S306, the HDD notifies the host of a cause of the error or an operation state, in operation S314.

More specifically, the HDD obtains at least error information specifying a type of the error occurring in the HDD and information (hereinafter, referred to as state information) on operation conditions of the HDD and notifies the host of the error information and the state information.

The error information and the state information are reported in real time using a serial interface and do not follow the ATAPI command standards. Accordingly, to provide sufficient information necessary to take measures to deal with the error and a cause of the error occurring in the HDD is possible.

Further, the error information represents information on a type of a command issued from the host and the type of the error occurring in the HDD, and the state information represents information related to the operation of the HDD, such as an operation temperature of the HDD, a cut-off frequency, a boost value, a bandwidth, or a gain value of a finite inverse response (FIR) filter.

According to the method of controlling an HDD, the host is notified of the state information if an error occurs while executing the command issued from the host.

Figure 4:
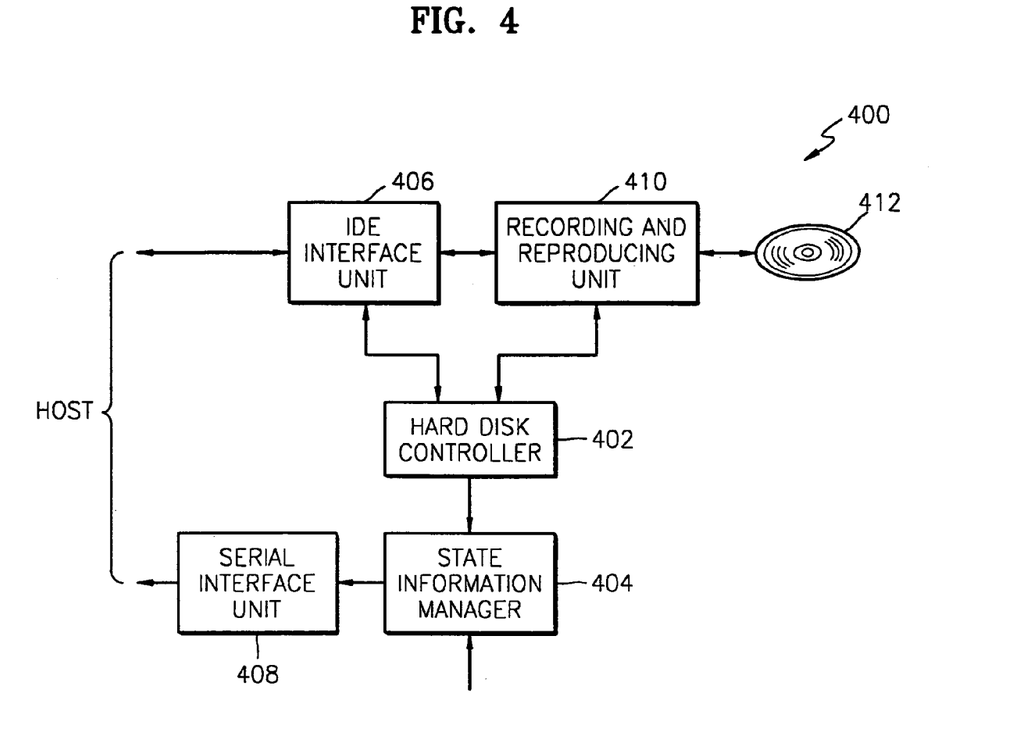
FIG. 4 is a block diagram of an HDD according to a second embodiment of the present invention.

FIG. 4 is a block diagram of an HDD 400 according to a second embodiment of the present invention. Referring to FIG. 4, the HDD 400 includes a hard disk controller 402, a state information manager 404, an IDE interface unit 406, and a serial interface unit 408.

The IDE interface unit 406 serves as an interface between a host and the HDD 400 so that data and commands are transmittable between the host and the HDD 400 via the IDE interface unit 406. The hard disk controller 402 controls a recording and reproducing unit 410 based on the commands and data provided via the IDE interface unit 406 so that data is recordable on or is reproducible from a medium 412.

The state information manager 404 manages state information of the HDD 400 and receives error information from the hard disk controller 402. The state information manager 404 notifies the host of the error information and the state information via the serial interface unit 408 in real time.

Since the HDD 400 is able to notify the host of the state information thereof in real time while recording data on and reproducing data from the medium, for a user to appropriately and immediately deal with an error which has occurred in the HDD 400 is possible.

The error information and the state information are output via not the IDE interface unit 406 but the serial interface unit 408 provided separately from the IDE interface unit 406. Accordingly, a transmission of details of the error information, which cannot be achieved in a conventional ATAPI command system, is possible.

Figure 5:
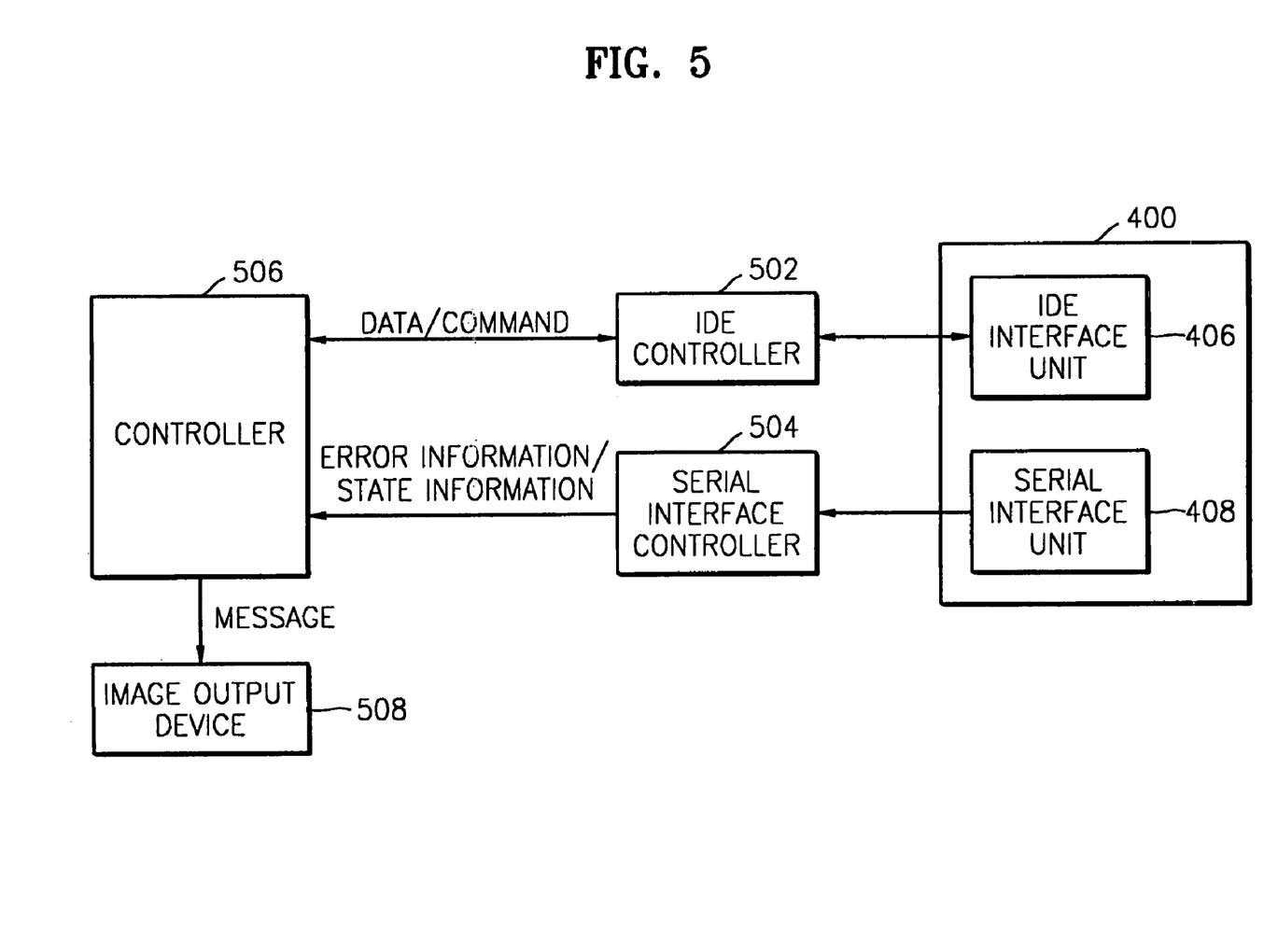
FIG. 5 is a block diagram of a data processing apparatus according to a third embodiment of the present invention.

FIG. 5 is a block diagram of a data processing apparatus according to a third embodiment of the present invention. Referring to FIG. 5, reference numerals 502, 504, 506, and 508 represent an IDE controller, a serial interface controller, a controller, and an image output device, respectively.

The IDE controller 502 and the serial interface controller 504 correspond to the first and second controllers, respectively, which have already been mentioned in the Summary of the Invention section, and the IDE interface unit 406 and the serial interface unit 408, respectively, of the HDD 400 shown in FIG. 4.

The IDE controller 502 and the HDD 400 interface with each other in an IDE interface manner and receive necessary information from or transmit necessary information to each other by using ATAPI commands.

The serial interface controller 504 receives error information and state information from the HDD 400 in a serial interface manner.

The controller 506 controls data recording and reproducing operations performed by the HDD 400 by using the IDE controller 502 and receives the error information and the state information provided by the HDD 400 by using the serial interface controller 504.

The controller 506 determines a way to deal with an error occurring in the HDD 400 based on the error information and the state information provided by the HDD 400 and outputs a message showing the way to deal with the error to a user by using the image output device 508.

Figure 6:
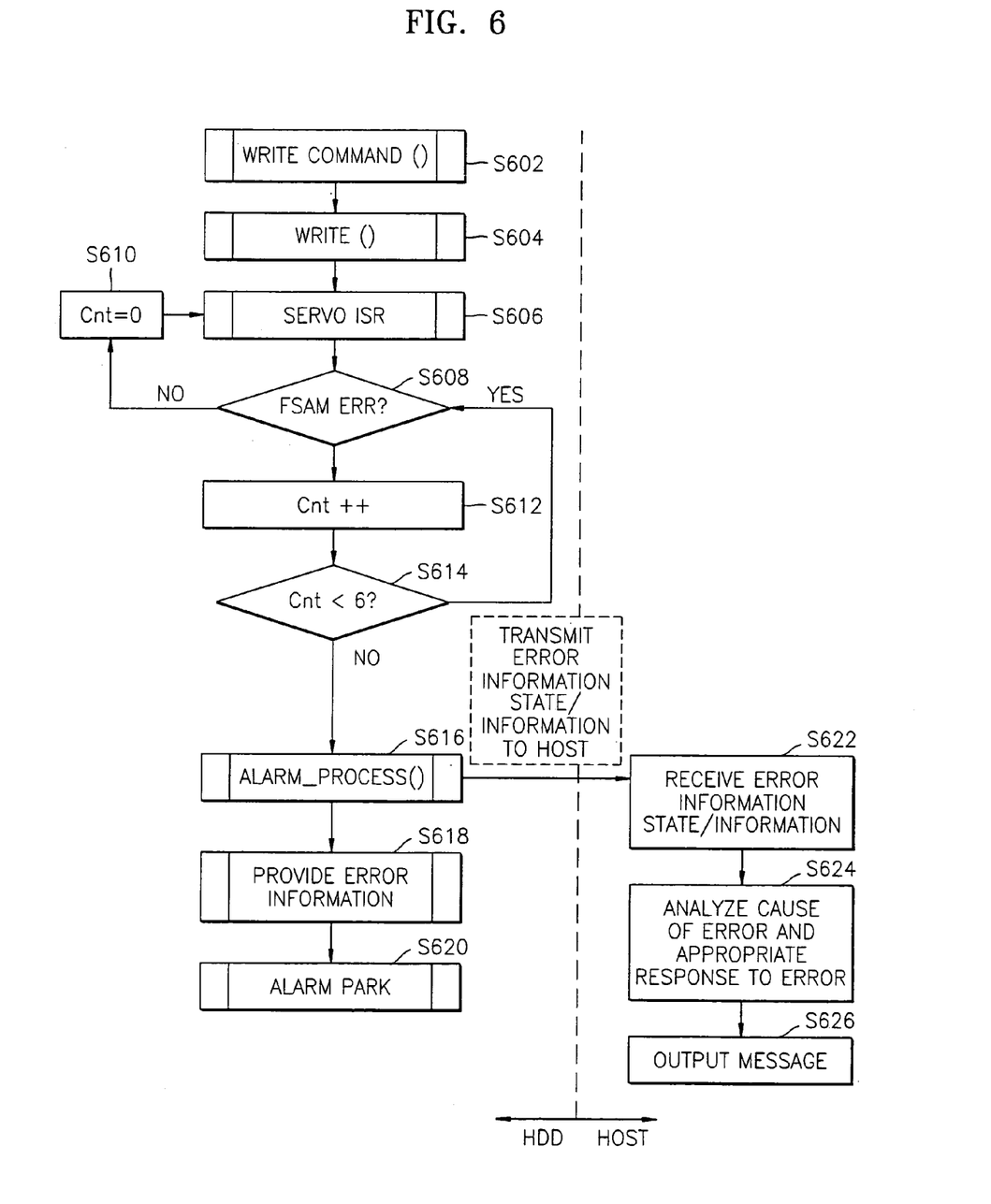
FIG. 6 is a diagram illustrating an example of responding to an error occurring in an HDD in the data processing apparatus shown in FIG. 5.

FIG. 6 is a diagram illustrating an example of dealing with an error occurring in an HDD in the data processing apparatus shown in FIG. 5. FIG. 6 shows a method of dealing with the error in the HDD in a case where a critical error called a fault of a sector address mark (FSAM) occurs during recording data on a medium, in response to a record command applied to the HDD from a host.

Referring to FIG. 6, the record command is applied to the HDD from the host in operation S602.

Data is recorded at a designated place on the medium in response to the record command issued from the host in operation S604.

The HDD performs servo-ISR while recording data on the medium in operation S606.

Whether or not an FSAM occurs is checked in operation S608. If the FSAM has not yet occurred, a counting variable Cnt is set to 0 in operation S610, and the process goes back to operation S606.

If the FSAM occurs, a value of the variable Cnt is increased by 1 in operation S612.

Whether or not the value of the variable Cnt is small than 6 is checked in operation S614. If the variable Cnt has a value smaller than 6, the process returns to operation S608 and whether or not the FSAM occurs is checked again.

If the variable Cnt has a value of 6 or greater in operation S614, the HDD considers that an FSAM error has occurred six times in a row and to stop the data recording process and to notify the host of the current situation is necessary in operation S616.

Next, in operation S618, error information is provided to the state information manager 404 of FIG. 4. The state information manager 404 outputs the error information provided in operation S618 and state information having been managed by the state information manager 404 to the host via the serial interface unit 408. Since an operation of the serial interface unit 408 and an operation of the IDE interface unit 406 are performed, in parallel, irrespective of the data recording operation of the HDD 400, the error information and the state information are providable to an outside of the HDD 400 in real time.

Next, in operation S620, a parking operation is performed so that a head of the HDD returns to a parking region, in order to prevent the head from damaging the medium.

The error information and the state information are provided to the host via the serial interface unit 408, and the host receives the error information and the state information in operation S622.

The host analyzes the error information and the state information provided by the HDD and determines an appropriate measure to deal with the error occurring in the HDD in operation S624.

The host notifies a user of the analysed information and the measure to deal with the error occurring in the HDD in operation S626.

Figure 7:
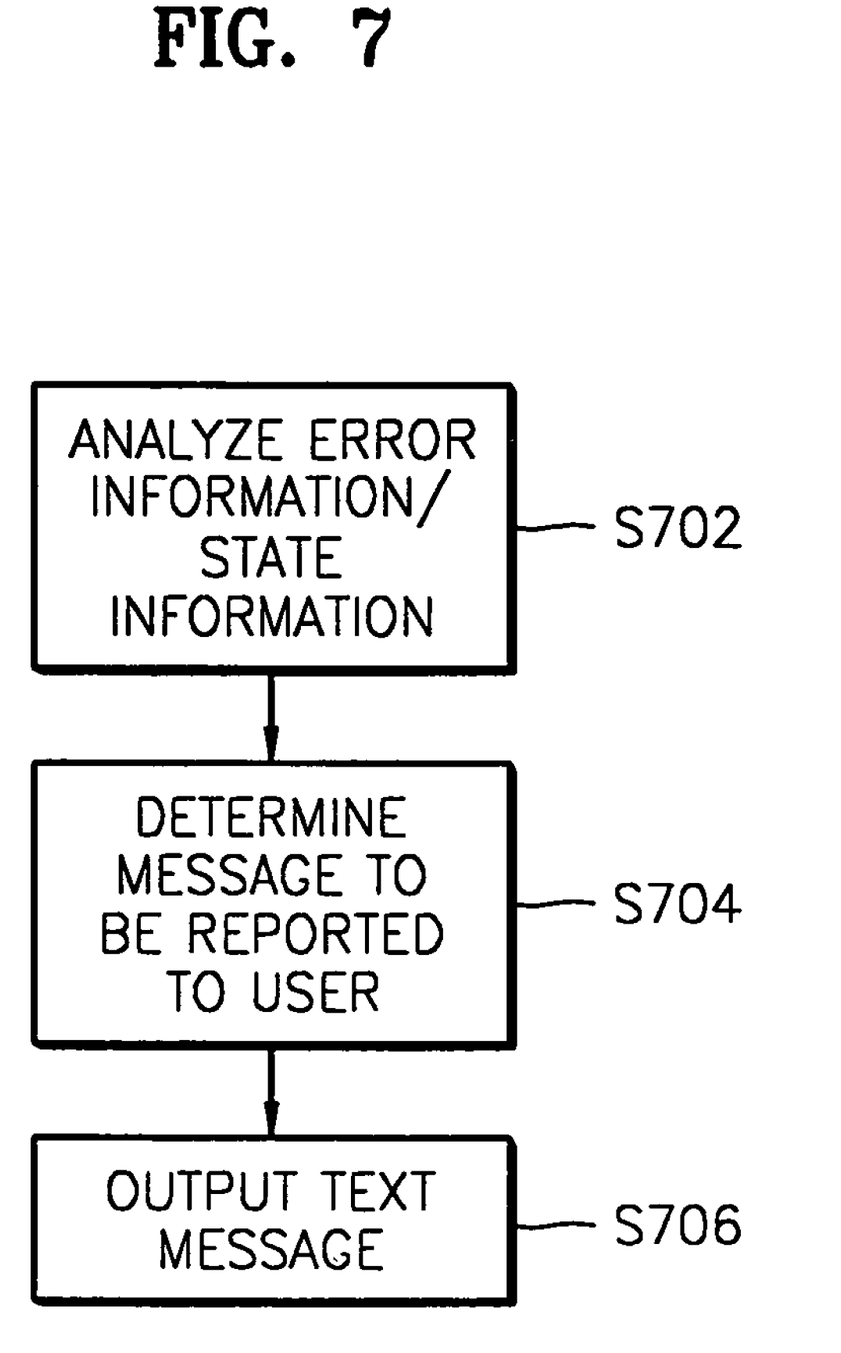
FIG. 7 is a diagram illustrating another example of responding to an error occurring in the HDD in the data processing apparatus shown in FIG. 5.

FIG. 7 is a diagram illustrating another example of dealing with an error occurring in the HDD 400 in the data processing apparatus shown in FIG. 5. FIG. 7 shows an operation of dealing with an error in the HDD 400 in a case where a weak write error occurs in the HDD 400 due to a low temperature in the HDD.

The weak write error indicates a state where data is not recorded with a normal degree of write power even though a normal write current is applied to a head of the HDD 400. For example, a coercive force of a medium increases at low temperatures due to physical characteristics of the medium, in which case the weak write error is more likely to occur.

A host analyzes error information and state information provided by the HDD 400 in operation S702.

The host determines an appropriate measure to deal with the error occurring in the HDD 400 in operation S704. For example, if a recording failure error occurs in the HDD 400 and an operation temperature of the HDD 400 is low, the host considers that the weak write error occurred in the HDD 400 due to the low operation temperature of the HDD 400. Then, in operation S704, the host notifies a user of a determined measure to deal with the error in the HDD 400, which involves increasing the operation temperature of the HDD 400 and reapplying a record command to the HDD 400.

In operation S706, the host outputs the determined measure to deal with the error in the HDD 400 to the user in the form of a text message by using an image output device 510 of FIG. 5. The host controls a text message generator (not shown) so that a desired text message is displayable on a screen of a display of the image output device 510.

In a case where the weak write error occurs, to record data on the medium in a normal operation is not possible, and, thus, a recording failure error is more likely to occur. According to the conventional ATAPI command system, only error information, i.e., information as to whether or not the recording failure error occurs is transmittable to the host, and to notify the host of other information, like information on a state of an HDD, such as an operation temperature of the HDD, is not possible. Accordingly, an operation to deal with an error in the HDD by preventing data from being recorded on a medium at low temperatures so that the data is recordable at room temperature is not possible.

In the present invention, unlike the conventional art, the HDD 400 stops a data recording process and provides an operation temperature of the HDD 400 to a host at a same time when a weak write error occurs. Then, the host analyses the operation temperature of the HDD 400 and determines that the data recording process is stopped due to the weak write error caused by a low operation temperature of the HDD 400. Thereafter, the host urges a user to take an appropriate measure to deal with the data recording failure by outputting a message to the user indicating that data should be rewritten at a normal temperature.

In a conventional HDD, if an error occurs while the HDD is performing a predetermined operation in response to a command issued from a host, only an error message, for example, a message saying "Data cannot be recorded in the HDD," is displayed, and thus for the user to precisely determine what caused the error is difficult.

A data recording failure may caused by defects in an HDD or a data transmission system. However, in a case where an error occurs in an HDD in a conventional data processing apparatus, for a user to precisely determine a state of the HDD and a cause of the error is not possible.

Especially in a device which has an HDD hermetically sealed but does not include any tools to diagnose the state of the HDD, like a PVR, to determine the cause of the error in the HDD is even more difficult.

In the data processing apparatus according to the present invention, a type of an error occurring in an HDD and operation conditions of the HDD are transmitted to a host, and then the host determines a cause of the error and an appropriate measure to deal with the error by analyzing the transmitted information. Thereafter, the host presents the cause of the error and the measure to deal with the error to a user, and thus, to enhance a reliability of the HDD and to decrease a defect rate of the HDD, which may increase due to inappropriate error recovery methods, is possible.

Embodiments of the present invention have been present so far by taking an HDD as an example. However, it is obvious to one skilled in the art that the present invention can also be applied to peripheral computer devices other than the HDD in the same manner as presented here.

As described above, the HDD according to the present invention may inform a user of state information of the HDD in real time while recording data on and reproducing data from a medium. Accordingly, for a user to immediately deal with an error occurring in the HDD is possible.

Further, since in the present invention, unlike in a conventional ATAPI command system, error information and state information are output via a serial interface and not via an IDE interface, by which data is transmittable between elements of a data processing apparatus, to precisely transmit details of the error information is possible.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of providing information on an error in a hard disk drive including a first interface unit transmitting data reproduced from a medium and receiving data to be recorded on the medium and a second interface unit providing the error information to an outside of the hard disk drive, comprising:
   obtaining the error information including a type of the error occurring in the hard disk drive and state information indicating operation conditions of the hard disk drive; and
   outputting the error information and the state information in real time to the outside via the second interface unit.

2. The method of claim 1, wherein outputting of the error information and of the state information to the outside is performed independent of a data process performed using the first interface unit.

3. The method of claim 1, wherein:
   obtaining the error information comprises
      operating the first interface unit based on a first command standard
   obtaining the state information comprises
      operating the second interface unit based on a second command standard.

4. The method of claim 3, wherein the first command standard is an ATAPI command standard.

5. The method of claim 1, wherein the outputting of the error information and of the state information are reported in real time using a serial interface, as the second interface unit, which does not follow the ATAPI command standard.

6. The method of claim 1 wherein the outputting of the state information comprises:
   notifying a host of the state information if the error occurs while executing a command issued from the host.

7. A hard disk drive which records data applied from an outside on a medium or reproduces data recorded on the medium and provides the reproduced data to the outside, comprising:
   a first interface unit transmitting data reproduced from the medium to the outside and receiving data to be recorded on the medium from the outside;
   a hard disk controller controlling data to be recorded on the medium or reproduced from the medium and providing error information including a type of an error occurring in the hard disk drive;

a state information manager managing the error information provided by the hard disk controller and state information indicating operation conditions of the hard disk drive; and a second interface unit outputting the error information and the state information provided by the state information manager in real time to the outside when an error occurs.

8. The hard disk drive of claim 7, wherein the second interface unit performs a serial interface.

9. A data processing apparatus including a hard disk drive having a first interface unit transmitting data reproduced from a medium and receiving data to be recorded on the medium and a second interface unit providing error information to an outside, comprising:

a first controller corresponding to the first interface unit;

a second controller corresponding to the second interface unit;

a third controller controlling data recording and reproducing operations of the hard disk drive by using the first controller, and receiving the error information provided by the hard disk drive by using the second controller; and an output device to provide the error information to a user.

10. The data processing apparatus of claim 9, wherein the third controller receives state information indicating operation conditions of the hard disk drive and the error information from the hard disk drive via the second controller, determines an appropriate measure to deal with an error which occurs in the hard disk drive based on the error information and the state information, and informs the user of the appropriate measure.

11. The data processing apparatus of claim 9, wherein the data processing device is a personal video recorder.

12. A method of providing information about an error occurring in a hard disk drive including first and second interface units to transmit data to and to receive data from a recording medium while providing the error information to an outside of the hard disk drive, comprising:

acquiring the error information including a type of the error occurring in the hard disk drive and state information indicating operation conditions of the hard disk drive; and outputting the error information and the state information to the outside via only the second interface unit.

13. A hard disk drive to record data applied from an outside on a medium or to reproduce data recorded on the medium and to provide the reproduced data to the outside, comprising:

a first interface unit to transmit the data reproduced from the medium to the outside and to receive the applied data to be recorded on the medium from the outside;

a hard disk controller to control the applied data to be recorded on the medium or to control the recorded data to be reproduced from the medium and to provided error information of at least a type of an error occurring in the hard disk drive;

a state information manager to manage the error information and state information indicating operation conditions of the hard disk drive; and a second interface unit to output the error information and the state information to the outside in real time.

14. A hard disk drive to record data applied from an outside on a medium or to reproduce data recorded on the medium and to provide the reproduced data to the outside, comprising:

a first interface unit to transmit the data reproduced from the medium to the outside and to receive the applied data to be recorded on the medium from the outside;

a hard disk controller to control the applied data to be recorded on the medium or to control the recorded data to be reproduced from the medium;

a state information manager to manage state information indicating operation conditions of the hard disk drive; and a second interface unit to output the state information to the outside in real time.

15. A hard disk drive to record data applied from an outside on a medium or to reproduce data recorded on the medium and to provide the reproduced data to the outside, comprising:

a first interface unit to transmit the data reproduced from the medium to the outside and to receive the applied data to be recorded on the medium from the outside;

a controller to control the applied data to be recorded on the medium or to control the recorded data to be reproduced from the medium and to provided error information of at least a type of an error occurring in the hard disk drive; and a second interface unit to output the error information in real time.

16. The hard disk drive of claim 15, further comprising:

a state information manager to manage state information of the hard disk drive and to receive the error information from the controller.

17. The hard disk drive of claim 16, wherein the state information is at least one of an operation temperature of the hard disk drive, a cut-off frequency, a boost value, a bandwidth or a gain value of a finite inverse response filter.

18. A data processing apparatus including a hard disk drive having first and second interface units to transmit data to and to receive data from a recording medium while providing error information to an outside of the hard disk drive, comprising:

a first controller corresponding to the first interface unit to control data recording and reproducing operations of the hard disk drive;

a second controller corresponding to the second interface unit to control receiving the error information provided by the hard disk drive;

a third controller managing the first and second controllers; and an output device to provide the error information to a user.

19. The data processing apparatus of claim 18, wherein the third controller receives state information indicating operation conditions of the hard disk drive and the error information from the hard disk drive via the second controller to determine an action to be performed to handle an error which occurs in the hard disk drive based on the error information and the state information, and informs the user of the action to be performed.

20. A data processing apparatus including a hard disk, comprising:

a first interface unit to transmit data reproduced from a medium to an outside of the hard disk drive and to receive applied data to be recorded on the medium from the outside of the hard disk drive;

a controller to control the applied data to be recorded on the medium or to control the recorded data to be reproduced from the medium and to provide error information of at least a type of an error occurring in the hard disk drive;

a second interface unit outputting the error information provided from the hard disk drive to the controller in real time; and an output device to provide the error information to a user.

21. The data processing apparatus of claim 20, wherein the controller receives state information indicating operation conditions of the hard disk drive and the error information from the hard disk drive via the second interface unit to determine an action to be performed to handle an error which occurs in the hard disk drive based on the error information and the state information, and informs the user of the action to be performed.

22. The data processing apparatus of claim 20, wherein the first interface unit operates based on a first command standard while the second interface unit operates based on a second command standard.

23. The data processing apparatus of claim 20, further comprising:

a state information manager to manage state information of the hard disk drive and to receive the error information from the controller.

24. The data processing apparatus of claim 23, wherein the state information is at least one of an operation temperature of the hard disk drive, a cut-off frequency, a boost value, a bandwidth or of a gain value of a finite inverse response filter.

25. The data processing apparatus of claim 20, wherein the first and second interface units are separate from each other.

26. A method of providing information about an error occurring in a peripheral computer device including first and second interface units to transmit data to and to receive data from a recording medium while providing the error information to an outside of the peripheral computer device, comprising:

acquiring the error information including a type of the error occurring in the peripheral computer device and state information indicating operation conditions of the peripheral computer device; and outputting the error information and the state information in real time to the outside via only the second interface unit.

27. A peripheral computer device to record data applied from an outside on a medium or to reproduce data recorded on the medium and to provide the reproduced data to the outside, comprising:

a first interface unit to transmit the data reproduced from the medium to the outside and to receive the applied data to be recorded on the medium from the outside;

a controller to control the applied data to be recorded on the medium or to control the recorded data to be reproduced from the medium and to provided error information of at least a type of an error occurring in the peripheral computer device; and a second interface unit to output the error information in real time.

* * * * *

UNITED STATES PATENT AND TRADEMARK OFFICE
CERTIFICATE OF CORRECTION

| | | |
|---|---|---|
| PATENT NO. | : 7,222,267 B2 | Page 1 of 1 |
| APPLICATION NO. | : 10/685709 | |
| DATED | : May 22, 2007 | |
| INVENTOR(S) | : Seung-youl Jeong | |

It is certified that error appears in the above-identified patent and that said Letters Patent is hereby corrected as shown below:

Column 8, Line 55, change "claim 1" to --claim 1,--.

Signed and Sealed this

Fourth Day of September, 2007

JON W. DUDAS
*Director of the United States Patent and Trademark Office*